April 19, 1960 L. A. FISH 2,933,111
RADIAL ARM SAW
Filed Aug. 1, 1957 2 Sheets-Sheet 1
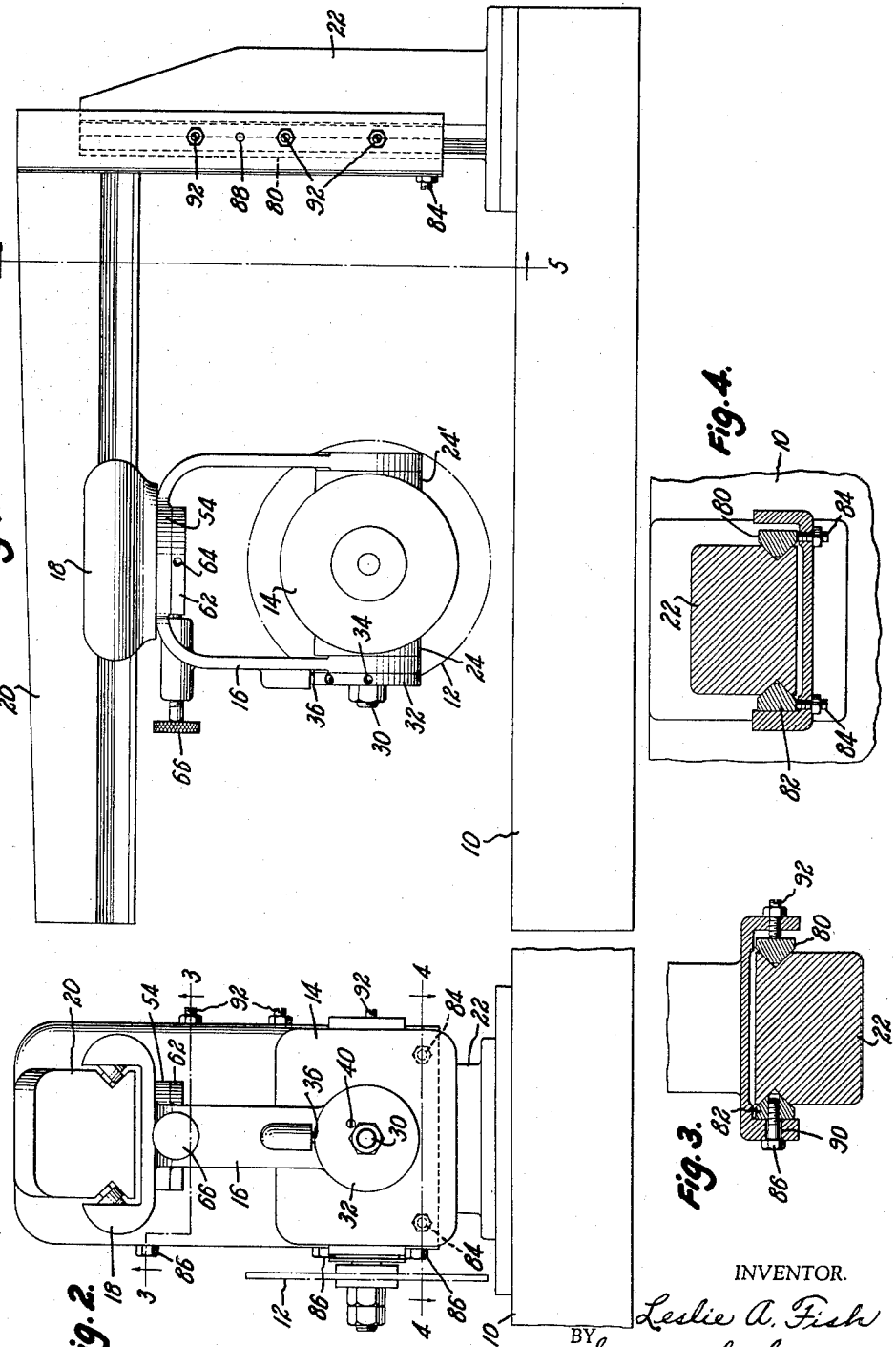
INVENTOR.
Leslie A. Fish
Edwin E. Gregg
BY April 19, 1960 L. A. FISH 2,933,111
RADIAL ARM SAW
Filed Aug. 1, 1957 2 Sheets-Sheet 2
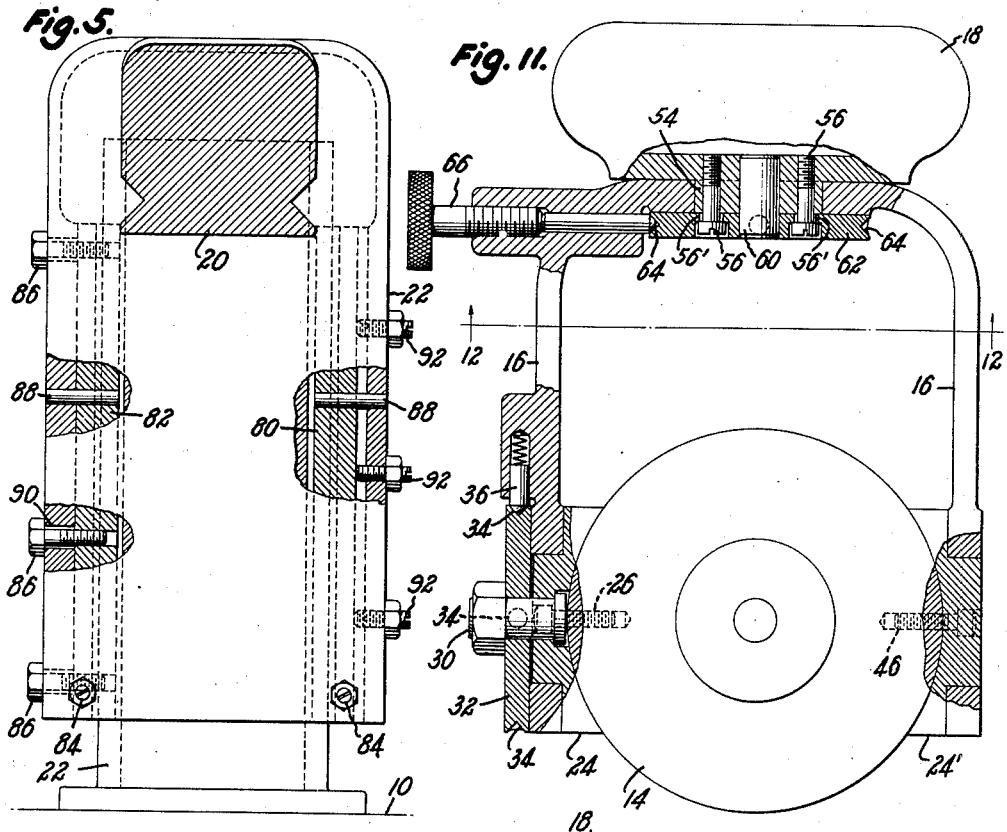
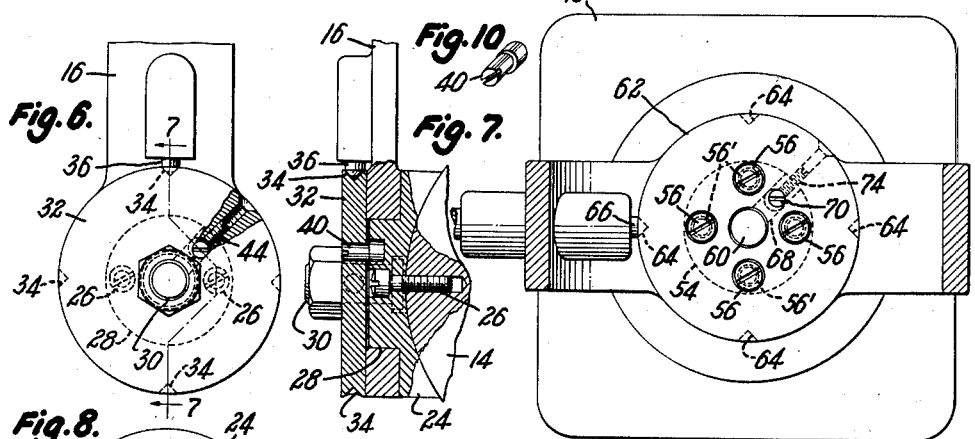
INVENTOR.
BY Leslie A. Fish
Edwin E. Greigg

United States Patent Office 2,933,111
Patented Apr. 19, 1960

2,933,111

RADIAL ARM SAW

Leslie A. Fish, Phillipsburg, N.J.

Application August 1, 1957, Serial No. 675,724

5 Claims. (Cl. 143—6)

The present invention relates to radial arm saws, and has particular reference to an improved motor driven sawing machine for accurately and quickly adjusting a saw blade to a position that is square with its table mounting and that is parallel to the path of travel of the saw blade along a carriage on which it is mounted.

The general difficulties in using conventional radial arm saws, available on the market, or otherwise disclosed in the prior art, are that radial arm saws are characterized by consistently requiring extensive proportions of either shimming or a lengthy adjusting operation to obtain accurate and precision settings of the saw blade with respect to the table mounting and the path of travel of the carriage along the arm mounting.

The invention, accordingly, seeks to provide a novel radial arm saw having a quick and easy means for adjusting the vertical position of the saw blade with respect to the saw table mounting and equally as well having a means for adjusting the horizontal position of the saw blade with respect to the saw arm mounting.

Various other objects and advantages will be apparent from a detailed description of the invention and from the appended drawings and claims.

In the drawings:

Fig. 1 is a side elevational view of a radial arm saw including the saw table therefor embodying the invention;

Fig. 2 is a portion of a front elevational view of the radial arm saw embodying the invention;

Fig. 3 is a cross-sectional view of the column taken along line 3—3 of Fig. 2;

Fig. 4 is a cross-sectional view of the column taken along line 4—4 of Fig. 2;

Fig. 5 is in part a front elevational view of the column and in part a cross-sectional view of the arm deflection adjusting screws and arrangement therefor taken along line 5—5 of Fig. 1;

Fig. 6 is a detail view partly in section of the index plate, index pin and eccentric pin in the motor trunnion generally shown in Fig. 2;

Fig. 7 is a side elevational view mostly in cross-section of the arrangement viewed along line 7—7 of Fig. 6;

Fig. 8 is a detail view of the eccentric pin and the slot therefor in the motor trunnion;

Fig. 9 is a side elevational view in cross-section viewed along line 9—9 of Fig. 8;

Fig. 10 is a perspective view of the eccentric pin;

Fig. 11 is a side elevational view of the carriage yoke and motor trunnion partially in cross-section showing the several index plates and index pins thereof more generally shown in Fig. 1, and Fig. 12 is a cross-sectional view of the index plate and index pin arrangement of the carriage viewed along line 12—12 of Fig. 11.

Referring first to Fig. 1 there is illustrated a saw table 10, a saw blade 12, a motor 14 mounted on a yoke 16 for supporting the motor from a carriage 18 that is engaged to ride reciprocably along an arm 20 mounted on a column 22. The saw blade is mounted on a motor shaft of the motor in any conventional manner. The motor is securely mounted onto a motor trunnion 24 by several screws 26 particularly shown in Figs. 6 to 9 and 11. The configuration of the face of the trunnion adjacent the motor may be of any general type characterized to conform to the shape of the motor casing of motor 14, but the configuration of the portion or end of the motor trunnion 24 that engages an opening 28 in the yoke 16 is circular as also shown in Figs. 6 to 9 and 11. This relationship between the opening 28 and the circularly-ended trunnion allows the motor 14 to move freely about a central axis through the opening. To provide a secure mount for the motor, a clamping stud 30 is inserted through an opening in the trunnion in a manner shown in Fig. 9, and an index plate 32 having recesses 34 for a spring-biased index pin 36, is mounted on the stud 30. The index pin 36 is securely mounted to the yoke 16.

The circularly-ended trunnion is particularly characterized in having a machine slot 38 as shown in Fig. 8 in which is inserted an eccentric pin 40 disclosed in perspective in Fig. 10, having its generally circular portion projecting through a reamed opening in the index plate 32. The index plate is related to the motor trunnion 24 by the clamping stud 30 and the eccentric pin 40. Since the trunnions 24, 24' are bolted securely to the motor and since the index pin 36 is in recess 34, the relationship between the index plate and the motor trunnion can be angularly altered in a small degree by the rotation of the eccentric pin causing the eccentric end thereof to rotate in the slot 38. This rotation is usually accomplished when the nut on the clamping stud 30 is loosened. Once the eccentric pin 40 is set to a desired position, a set screw 44 is provided to lock the eccentric pin into place. Thereafter, when the nut on the clamp stud 30 is loosened, from time to time, to permit indexing of the motor from one position to another by rotating the index plate with respect to the yoke until the index pin engages a different recess in the index plate, the angular relationship between the index plate and the trunnion does not change. This, therefore, provides a fast and easy method of and means for adjusting the vertical position of the saw blade with respect to the saw table.

Although it is possible to provide substantially the same eccentric pin arrangement at the right-hand side of the motor as viewed and shown on the left hand side of the motor in Figs. 1 and 11, for minutely adjusting the angular position of the motor with respect to the yoke, such duplication of arrangement is not necessary for this embodiment of the invention being described, and simple threadedly-engaging screws 46 are sufficient to mount the trunnion onto the motor. If it is desired a plate similar to the size of the index plate 32 may be coupled to the trunnion positioned at the right-hand side of the motor to maintain the circularly-ended trunnion within the yoke.

Substantially the same eccentric pin arrangement is provided in mounting the yoke 16 to a carriage trunnion 54 for rotation about a vertically disposed center stud 60 as shown in Fig. 12. An index plate 62 having several index recesses 64, is permanently secured to the carriage trunnion 54 by means of socket head cap screws 56 with relation to which the plate 62 is angularly adjustable to a predetermined limited extent due to the enlarged bores 56' in the plate 62 through which the screws 56 pass. A screw-pin 66 is threadedly mounted to the yoke and engages one of the recesses 64 when it is in the proper position of rotation. The carriage trunnion 54, which also is circularly-ended, has a machined slot 68 in which is inserted an eccentric pin 70, similar to that shown in Fig. 10, such as having its generally circular portion protruding through a reamed opening in the index plate 62. When the cap screws 56 are loosened, the eccentric pin 70 mounted in the index plate 62 may be rotated so that the position of the saw blade may be adjusted into a plane that is parallel to the path of travel of the carriage along the arm 20. As soon as the accuracy is determined, the eccentric pin 70 is set by set screw 74, and the cap screws 56 are retightened. This ajustment, it is noted, is accomplished while index pin 66 is engaged in the index plate 62.

Other means of centering the index plate 32 (Figs. 1, 6, 7), as well as index plate 62 (Figs. 11 and 12), could also be used, such as machining a rabbet diameter on the circularly-ended portions of the trunnions 24 and 25 which would center the index plates on either the inside diameter or outside diameter thereof, but the necessary feature for accurate indexing of the plates is that the plates must be centered about a fixed point so that angular error is eliminated between the positioning from one setting to the next.

The path of the travel of the carriage 18 along the arm 20 is maintained parallel to the table 10 by adjustment which is accomplished by pivoting a gib 80 on one side exactly in line with the pivot point on the opposite gib 82 and in conjunction therewith providing arm deflecting adjusting screws 84. In Figs. 3 and 4 the gibs disclosed are of the V type construction with the convex V of the gib matching a concave V machined on either side of the column 22. It is virtually impossible as well as substantially impractical to maintain accuracy of the machined surfaces of the gibs or any similar adjusting means, so that an assembly must be provided with an arm which is perfectly aligned with the table 10. A deflection of the arm takes place as the carriage moves away from the column end thereof due to the change in moment-arm of the column end arm. Since it is also desirable that the saw blade 12 mounted on the motor be used to cut a path in a work piece parallel to the table, adjustment screws 84 are provided to compensate for errors of machining as well as errors due to moment-arm deflections of the arm 20. The arm therefore is pivoted with respect to the gibs for providing exact compensation for these errors. Here the weight of the arm, the carriage and the elements mounted thereon operate to keep the adjusting screws tight and secure against the gibs. As soon as the proper adjustment of the screws 84 is accomplished, the gib clamp bolts 86 are tightened. The portion of the gib clamp bolts that passes through the column channel 22 have sufficient clearance as shown at 90 in Fig. 3 as to permit transverse adjusting movement of the bolt and when it is completely tightened, the bolts 86 maintain the adjustment permanently. Usually, before the adjustment for deflection is accomplished, the gib adjusting screws 92 are taken up so that there is no play between the gibs and the ways in the column.

While the gib pivot point 88 is illustrated at a point approximately one-half to two-thirds of the distance from the bottom of the gib to the top thereof, it is obvious that this pivot point could be at the top, or at the bottom, or at an intermediate point therebetween with corresponding changes in the location of the arm deflection adjusting screws 84. For example, if the pivot point was located at the bottom of the column, the adjusting screws would then necessarily be inserted on the opposite side of the arm skirt and at the top thereof so as to maintain constant contact between the screw and the gib as the result of the weight of the arm. It is also possible to use eccentric type pins, such as is shown in Fig. 10, positioned in the side of the arm skirt that will work in slots in the gib to provide substantially the same type of adjustment.

While the arrangement shown works adequately on the gib type arm and column assemblies, it is entirely possible to apply the same principles and features to radial saws employing tubular columns.

It should be understood, however, that the specific apparatus herein illustrated and described is intended to be representative only, as many changes may be made therein without departing from the clear teachings of the invention. Accordingly, reference should be made to the following claims in determining the full scope of the invention.

What is claimed is:

1. A radial arm saw comprising a table, a column supported from one end of the table, an arm overhanging the table carried by the column, a horizontal track along the arm, a carriage reciprocably arranged for movement along the horizontal track, a yoke suspended from the carriage and selectively positioned about a vertical axis thereof, a motor, trunnion means for rotatably supporting the motor from the arms of the yoke, an index plate fixed to the trunnion means and having recesses in the periphery thereof, an index pin attached to an arm of the yoke for engaging the recesses of the index plate, said trunnion means having a radially disposed slot with respect to the axis thereof, and an eccentric pin for precision-adjusting the angular relation of the trunnion means to the index plate having a concentric portion projecting through a reamed opening in the index plate and having an eccentric portion thereof positioned in the radially disposed slot so that the position of the saw may be adjusted into a plane parallel to the path of travel of the carriage along the arm.

2. The radial arm saw of claim 1, further including a set screw in the trunnion means for securing the eccentric pin into place.

3. A radial arm saw comprising a table, a column supported from one end of the table, an arm overhanging the table and supported by the column, a horizontal track along the arm thereof, a carriage for riding on the horizontal track, a yoke suspended from the carriage being selectively positioned about a vertical axis thereof, a motor, a first trunnion for rotatably supporting one side of the motor from the yoke with respect to an axis of the motor, a second trunnion means for rotatably supporting the other side of the motor from the yoke along the same said axis of the motor, an index plate secured to the first trunnion means along the axis of the motor and having recesses in the peripheral portions thereof, an index pin attached to the yoke for engaging the recesses, said first trunnion means having a slot along a radius with respect to a center formed by the axis of the motor, and an eccentric pin for precision-adjusting the angular relation of the trunnion means to the index plate and having a circular portion thereof projecting through a reamed opening in the index plate and having an eccentric portion thereof positioned in the slot.

4. The radial arm saw of claim 3, further characterized by said carriage including a carriage trunnion rotatably disposed with respect to the yoke, a carriage index plate secured to the carriage trunnion along the vertical axis thereof and having recesses in the peripheral portions thereof, a carriage index pin attached to the yoke for engaging the recesses of the carriage index plate, said carriage trunnion having a slot along a radius thereof with respect to the vertical axis, and a carriage eccentric pin for precision-adjusting the angular relation of the carriage trunnion to the index plate and having a circular portion thereof projecting through a reamed opening in the carriage index plate and having an eccentric portion thereof positioned in the slot.

5. A machine tool comprising a work table, a tool supporting arm overhanging the table by a column mounted from the work table, a carriage carried by the arm and reciprocably mounted thereof, a yoke supported by the carriage and oscillatable to different angular positions parallel with said table, said yoke including two arms having a circular opening in each of the arms, a motor for the machine tool having a configuration enveloping the motor, at least two trunnion means for mounting the motor onto the yoke and having one face to engage a portion of the configuration of the motor and another face that is circularly-ended for engaging the circular openings in each of the arms of the yoke, a set of motor mounting screws securing the trunnion means to the motor, a stud secured to one of the trunnion means, an index plate mounted on the stud and having index recesses on the periphery thereof, an index pin being spring mounted and secured to the yoke for engaging the recesses of the index plate, a radially disposed slot in said one trunnion means, a circular pin projecting through the index plate and having at one end thereof an eccentric portion closely fitting within the radial slot, and a set screw in the trunnion means for securing in place the position of the circular pin, said circular pin with the eccentric portion providing adjustment of the vertical position of the machine tool with respect to the plane of the work table.

References Cited in the file of this patent

UNITED STATES PATENTS

| | | |
|---|---|---|
| 333,631 | Holz et al. | Jan. 5, 1886 |
| 1,733,518 | Snover | Oct. 29, 1929 |
| 2,104,299 | Grundstein | Jan. 4, 1938 |
| 2,291,999 | Wilson et al. | Aug. 4, 1942 |
| 2,317,568 | Wallace et al. | Apr. 27, 1943 |
| 2,343,243 | Roemer | Mar. 7, 1944 |
| 2,590,093 | Duerr | Mar. 25, 1952 |
| 2,590,119 | Osterhus | Mar. 25, 1952 |